United States Patent [19]

Cox et al.

[11] Patent Number: 5,237,621
[45] Date of Patent: Aug. 17, 1993

[54] PRODUCT APPEARANCE INSPECTION METHODS AND APPARATUS EMPLOYING LOW VARIANCE FILTER

[75] Inventors: Kenneth A. Cox; Henry M. Dante; Robert J. Maher, all of Midlothian, Va.

[73] Assignee: Philip Morris Incorporated, New York, N.Y.

[21] Appl. No.: 742,323

[22] Filed: Aug. 8, 1991

[51] Int. Cl.$^5$ .............................................. G06K 9/62
[52] U.S. Cl. .......................................... 382/8; 382/14; 382/34
[58] Field of Search ....................... 382/14, 27, 22, 55, 382/8, 34

[56] References Cited

U.S. PATENT DOCUMENTS

| | | | |
|---|---|---|---|
| 3,835,332 | 9/1974 | Bridges | 250/563 |
| 4,021,778 | 5/1977 | Ueda et al. | 340/146.3 |
| 4,030,068 | 6/1977 | Banz | 340/146.3 |
| 4,053,056 | 10/1977 | Day | 209/73 |
| 4,097,845 | 6/1978 | Bacus | 340/146.3 |
| 4,110,737 | 8/1978 | Fahey | 340/146.3 |
| 4,119,946 | 10/1978 | Taylor | 340/146.3 |
| 4,259,661 | 3/1981 | Todd | 382/27 |
| 4,481,664 | 11/1984 | Linger et al. | 382/8 |
| 4,482,971 | 11/1984 | Blazek | 364/552 |
| 4,637,054 | 1/1987 | Hashim | 382/8 |
| 4,701,961 | 10/1987 | Hongo | 382/34 |
| 4,759,074 | 7/1988 | Iadi paolo et al. | 382/23 |
| 4,872,024 | 10/1989 | Nagai et al. | 346/1.1 |
| 4,893,346 | 1/1990 | Bishop | 382/8 |
| 4,912,554 | 3/1990 | Neri | 358/106 |
| 4,926,491 | 5/1990 | Maeda et al. | 382/14 |
| 4,932,065 | 6/1990 | Feldgajer | 382/9 |
| 4,952,062 | 8/1990 | Bean, III et al. | 356/430 |
| 4,972,262 | 11/1990 | Nichols | 358/160 |
| 4,972,494 | 11/1990 | White et al. | 382/8 |
| 4,974,261 | 11/1990 | Nakahara et al. | 382/22 |
| 4,975,971 | 12/1990 | Ohnishi | 382/8 |
| 4,975,972 | 12/1990 | Bose et al. | 382/8 |
| 5,014,327 | 5/1991 | Potter et al. | 382/14 |
| 5,129,009 | 7/1992 | Lebeau | 382/8 |

FOREIGN PATENT DOCUMENTS

| | | |
|---|---|---|
| 155789 | 9/1985 | European Pat. Off. . |
| 330495 | 8/1989 | European Pat. Off. . |
| 63-257083 | 10/1988 | Japan . |
| WO8910596 | 11/1989 | World Int. Prop. O. . |

OTHER PUBLICATIONS

R. M. Haralick, "Statistical Image Texture Analysis," in *Handbook of Pattern Recognition & Image Processing*, T. Y. Young and K. S. Fu (eds.) Academic Press, 1986.
R. J. Schalkoff: *Digital Image Processing and Computer Vision*, John Wiley, 1989, pp. 310–315.
J. Schurmann et al., "Erkennungssysteme furdie Zellbild-Analyse zur Krebsfruherkennung," *Wissenschaftliche Berichte AFG Telefunken*, vol. 52, No. 1-2, pp. 3–48 (1979).
R. C. Gonzalez, *Digital Image Processing*, Addison-Wesley Publishing Company, 1987, pp. 331–341.
W. K. Pratt, *Digital Image Processing*, John Wiley & Sons, Inc., 1978, pp. 478–492.

Primary Examiner—Leo H. Boudreau
Assistant Examiner—Larry J. Prikockis
Attorney, Agent, or Firm—Robert R. Jackson

[57] ABSTRACT

Images such as product images are identified as substantially similar to one or more reference images by finding pixels which have substantially the same value or values in all or substantially all of the reference images. Image erosion and/or dilation may be used in processing the reference image data to help identify pixels which can always be expected to have the same value in all acceptable images. The values associated with the corresponding pixels in a product image are combined and compared to an expected value, and the dot product between the product image and the discriminant function is equal to a predetermined value. The values associated with pixels which correspond to regions not similar in substantially all of the reference images are combined to produce a discriminant function.

13 Claims, 22 Drawing Sheets

PRODUCT APPEARANCE INSPECTION METHODS AND APPARATUS EMPLOYING LOW VARIANCE FILTER

BACKGROUND OF THE INVENTION

This invention relates to methods and apparatus for inspecting the appearance of products.

U.S. Pat. No. 5,146,510 (incorporated by reference herein) discloses product inspection systems which can be set up to acquire most of the information needed to perform a product inspection task with relatively little input from the human operator of the systems. Although the principles of the present invention can be used with other types of inspection systems, the systems of the above-mentioned prior patent are a good context in which to illustratively describe the present invention.

In a typical system in accordance with the prior patent, the data for a relatively small number of representative good product images is combined in a relatively simple way (e.g., using a logical OR function) to produce an initial discriminant function. This initial discriminant function is then used to compute statistical information about a relatively large number of product images compared to the initial discriminant function. For example, the dot product of the initial discriminant function and the data for each product image may be computed. The standard deviation of these dot products may then be computed and used to establish two sets of threshold values. Product images with dot products between upper and lower threshold values which are relatively close together are automatically to be classified as good ("acceptable") images. Product images with dot products outside upper and lower threshold values which are relatively far apart are automatically to be classified as bad ("unacceptable" or "rejectable") images. The operator of the system will be called upon to judge the acceptability of product images having dot products which do not fall in either of the foregoing categories.

After the foregoing statistical information has been computed, the information is used to progressively refine the initial discriminant function during the processing of a further relatively large number of product images. If for each successive product image in this group the dot product of the discriminant function and the image data is in the range of automatically acceptable images, the discriminant function is updated in accordance with the data for that image. If the dot product of the discriminant function and the image data is in the range of automatically rejectable images, the discriminant function is not updated in accordance with the data for that image. As a third possibility, if the product image is neither automatically acceptable nor automatically rejectable, the operator of the system is called upon to judge the acceptability of the image. If the operator judges the image acceptable, the discriminant function is updated as described above. Otherwise the discriminant function is not updated.

When the discriminant function has been sufficiently refined by the foregoing procedure, actual product inspection can begin using the refined discriminant function and the above-mentioned statistical information. As during discriminant function refining, when the dot product of the discriminant function and the image data for a product indicates that the image is acceptable, the product is accepted. Otherwise the product is rejected as having an unacceptable appearance.

The above-described systems work extremely well, but there is, of course, always room for further improvement. For example, many products have relatively large areas which include relatively little image information (e.g., a single solid color). Systems of the type disclosed in the above-mentioned prior patent are good at making sure that complicated image areas substantially conform to a predetermined norm. But in order to avoid improper rejection of too many acceptable images, the constraints employed in these systems cannot be too stringent. This tends to make these systems relatively insensitive to small defects or blemishes. Such defects or blemishes are especially noticeable in image areas which otherwise contain relatively little image information. So-called image segmentation may be used to segregate and separately process areas of various types in order to increase the overall sensitivity of the system without triggering false product rejections. However, the boundaries between optimum segments containing little image information and those containing more image information may be quite complex and difficult or impossible to specify in advance. At the very least, large amounts of operator time and a high degree of operator skill are required. It would be desirable to avoid the need for such operator resources. And even with a substantial investment of operator time and skill, it is unlikely that perfect or even close to perfect segregation of areas with little image information will be achieved.

In view of the foregoing, it is an object of this invention to improve and simplify methods and apparatus for inspecting the appearance of products.

It is another object of this invention to provide product appearance inspection methods and apparatus which have greater sensitivity without increased incidence of improper rejection of good products.

It is still another object of this invention to provide product appearance inspection methods and apparatus which can automatically identify image areas which contain relatively little image information and process those areas separately in a manner which is most appropriate to the information contained therein.

SUMMARY OF THE INVENTION

These and other objects of the invention are accomplished in accordance with the principles of the invention by providing product appearance inspection systems which include at least one filter function which is uniformly of one first value (e.g., binary 1) where all of a plurality of training images tend to be highly consistent with one another, and which is not of said first value (e.g., is binary 0) where all of said training images are not highly consistent with one another. For example, a filter function in accordance with this invention may be generated by binarizing each of the training images using a predetermined threshold value. The logical AND of all of the binarized training images is then formed to produce the filter function of this invention. Accordingly, this filter function has pixel values of one wherever all of the binarized training images had pixel values of one. All other pixels of this filter function are zero. The dot product of this filter function and the data for all good product images should therefore be substantially constant. Any dot product which deviates significantly from that expected constant value indicates an unacceptable product image and therefore an unacceptable product.

A possible alternative to the foregoing filter function may be computed as follows. In binarizing the training images as described above, the ones and zeros are reversed. The alternative filter function is again the logical AND of all of the binarized training images. Accordingly, the alternative filter function is again one where the pixels of all of the binarized training images are one and zero elsewhere. The dot product of the alternative filter function and all good product images should therefore be substantially constant, and any significant deviation from this constant value indicates an unacceptable product image.

It will be noted that each of the two exemplary filter functions described above is effectively "blind" where its pixel values are zero. However, the regions in which these two filter functions are one are mutually exclusive.

Each of the above-described filter functions may be described as a low variance filter function because each of these filter functions is one in a region (or regions) where the training images do not vary from one another. By computing these functions from a set of training images, the present invention makes it possible to identify these regions automatically with little operator input or intervention.

As another example of a filter function in accordance with this invention, the training image data can be edge enhanced before binarization. Edge enhancement tends to emphasize pixels at or near significant changes in image intensity, while de-emphasizing all other pixels. Accordingly, after binarization only the pixels emphasized by edge enhancement will be one, and all other pixels will be zero. Any suitable logical operation can then be performed on the resulting data to identify those pixels which are zero in the edge enhanced and binarized data for all or nearly all of the training images. A filter function can then be constructed having ones for all such pixels and zeros for all other pixels. The dot product of this filter function and the data for good images should again be relatively constant, and any significant deviation from this constant value indicates an unacceptable product image. Again this filter function identifies (by pixels which are one) image regions which do not vary very much from image to image. Accordingly, this filter function may again be thought of as a low variance filter function.

Because the filter functions of this invention tend to operate only on low variance portions of the image and to be "blind" elsewhere, these filters are advantageously combined with other filter functions which are active where the filters of this invention are not. Suitable examples of such other filter functions are the "discriminant functions" described in the above-mentioned prior application. (Although the "filter functions" of this invention could also be called discriminant functions, and although the "discriminant functions" of the prior application are also filter functions, this arbitrary difference in terminology is employed herein to help distinguish the "filter functions" of this invention from the other "discriminant functions" with which the present filter functions may be used if desired.) If desired, the selected filter function or functions of this invention can be made to exactly complement the other discriminant function by "turning off" (i.e., not using) the discriminant function for any pixels at which the filter function or functions of this invention are active (i.e., one), and using the discriminant function only for pixels at which the present function or functions are zero. This may conserve processing time and computational resources by avoiding duplicate processing of any pixel data and by automatically processing the data for each pixel using the filter or discriminant function which is more appropriate for that pixel.

Further features of the invention, its nature and various advantages will be more apparent from the accompanying drawings and the following detailed description of the preferred embodiments.

DETAILED DESCRIPTION OF THE PREFERRED EMBODIMENTS

Although the filter functions of this invention are usable in many other contexts, they are illustrated here in the context of comprehensive image inspection systems in which they are used with other discriminant functions to provide improved system performance. Similarly, although the data for the filter functions of this invention could be gathered in other ways, in the embodiments to be discussed first that data is gathered by using actual product inspection apparatus to generate a plurality of training images. Accordingly, suitable product inspection apparatus will first be described. And then it will be shown how that apparatus can be used to compute appropriate filter (and discriminant) functions and then to perform actual product inspection using those filter (and discriminant) functions.

Figure 1:
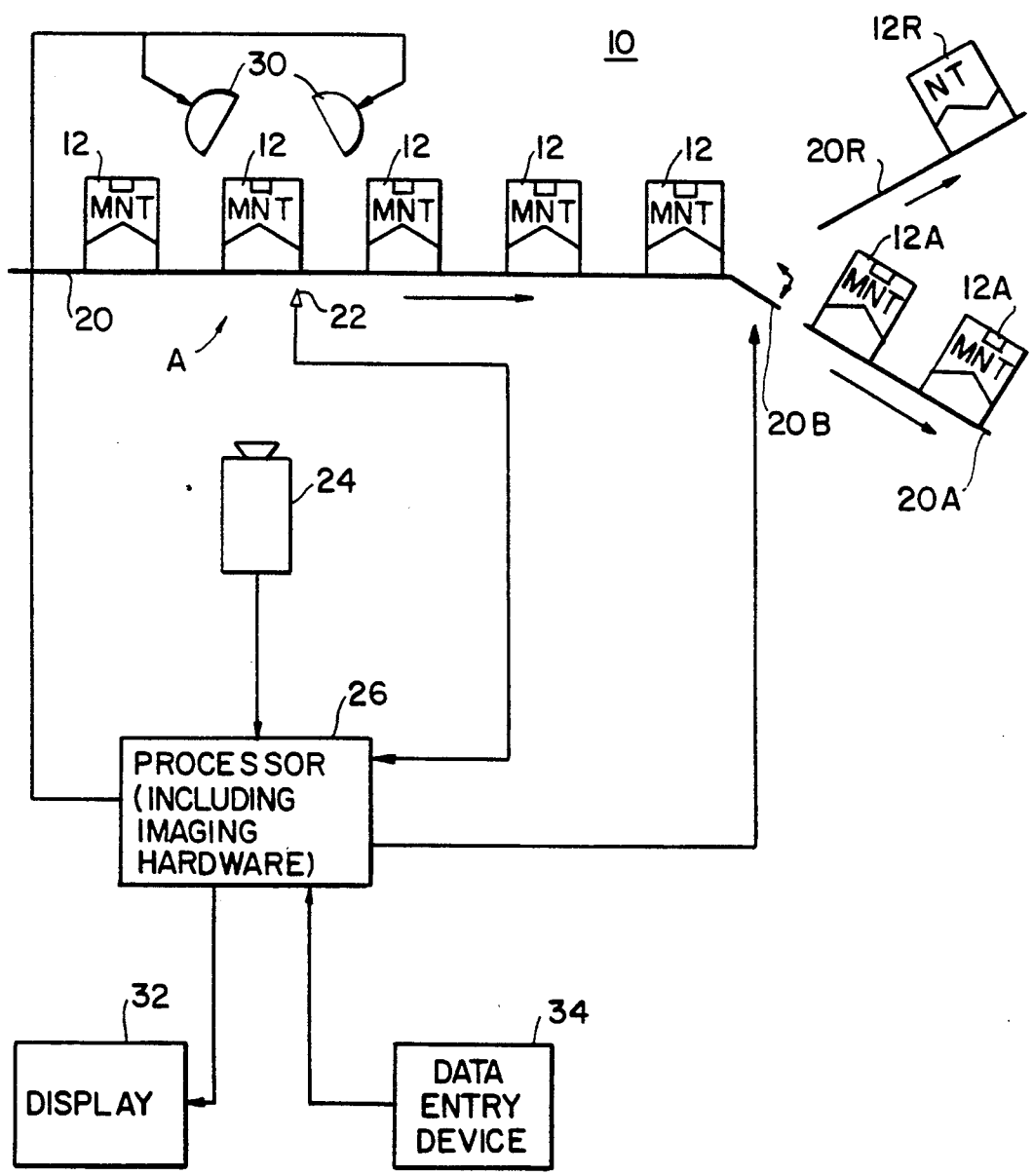
FIG. 1 is a simplified schematic block diagram of an illustrative embodiment of product appearance inspection apparatus constructed in accordance with the principles of this invention.

Illustrative product inspection apparatus 10 usable in accordance with this invention is shown in FIG. 1. At the level of detail shown in FIG. 1 this apparatus is the same as that shown in FIG. 1 of the above-mentioned prior patent. Products 12 to be inspected are conveyed one after another on conveyor 20 across the field of view of camera 24. Each time detector 22 detects that a product is properly positioned in front of the camera, processor 26 (which includes conventional imaging hardware) "grabs" the product image from the camera. Processor 26 may control lights 30 so that they momentarily illuminate the product in synchronism with this image grabbing operation. Processor 26 processes the image data as described in more detail below. If desired, the image may be displayed for observation by the operator of the system on display 32. The operator may also enter data or instructions for controlling the operation of the system via data entry device 34 (e.g., a keyboard and/or a "mouse"). Prior to actual product inspection the image data gathered as described above may be used by processor 26 to compute filter (and discriminant) functions for use during subsequent product inspection. During actual product inspection processor 26 uses these filter (and discriminant) functions to process the image of each successive product 12 and to control conveyor switch 20B to direct each product to the appropriate conveyor branch 20A (if processor 26 determines that the product has an acceptable appearance) or 20R (if processor 26 determines that the product does not have an acceptable appearance and should therefore be rejected).

As has been mentioned, the filter functions of this invention are usable with other filter functions such as the "discriminant functions" described in the above-mentioned prior patent. Accordingly, rather than repeating the prior disclosure, it will merely be shown and described how the previously disclosed systems can be modified in order to practice the present invention. Steps which are common to those previously disclosed are identified by the same (generally even) reference numbers herein and are typically not described here again in full detail. Steps which are new in accordance with the present invention have new (generally odd) reference numbers herein and are fully described.

Figure 2A:
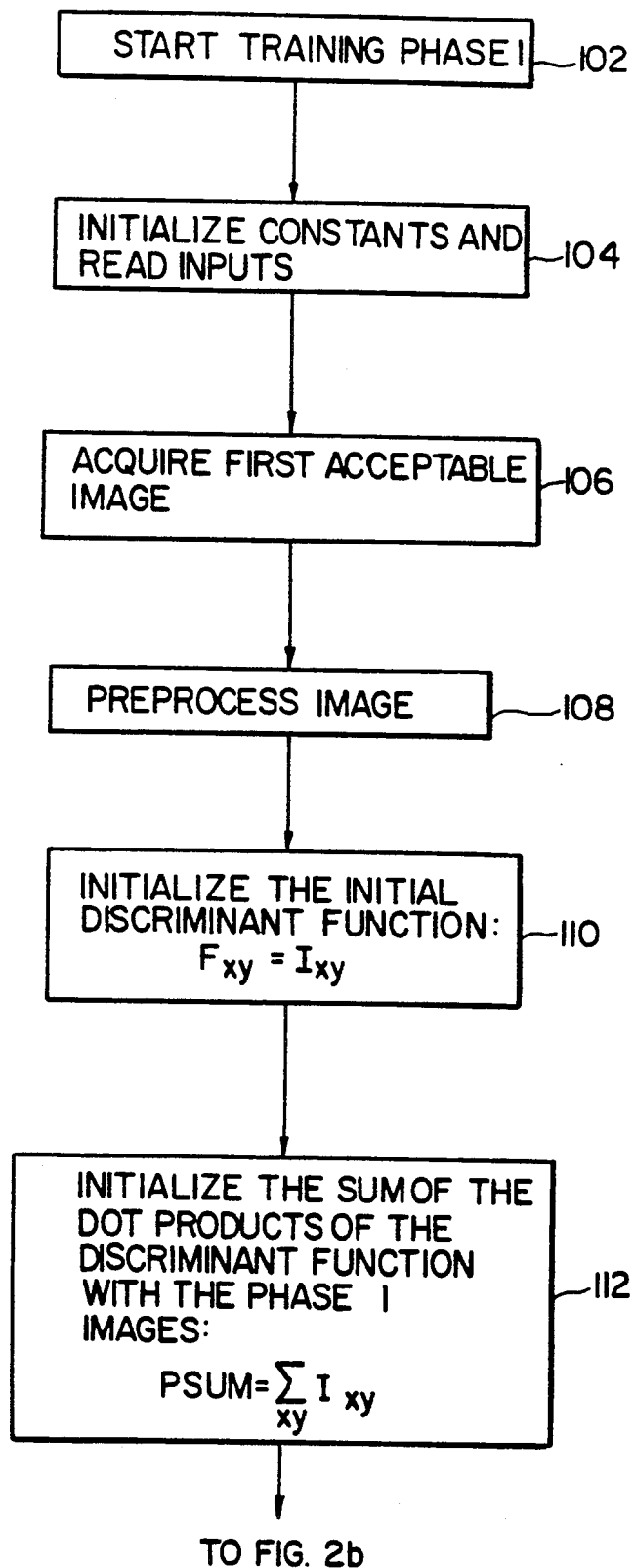
FIGS. 2a-2c (referred to collectively as FIG. 2) are a flow chart of a portion of an illustrative product appearance inspection method in accordance with this invention.
Figure 2B:
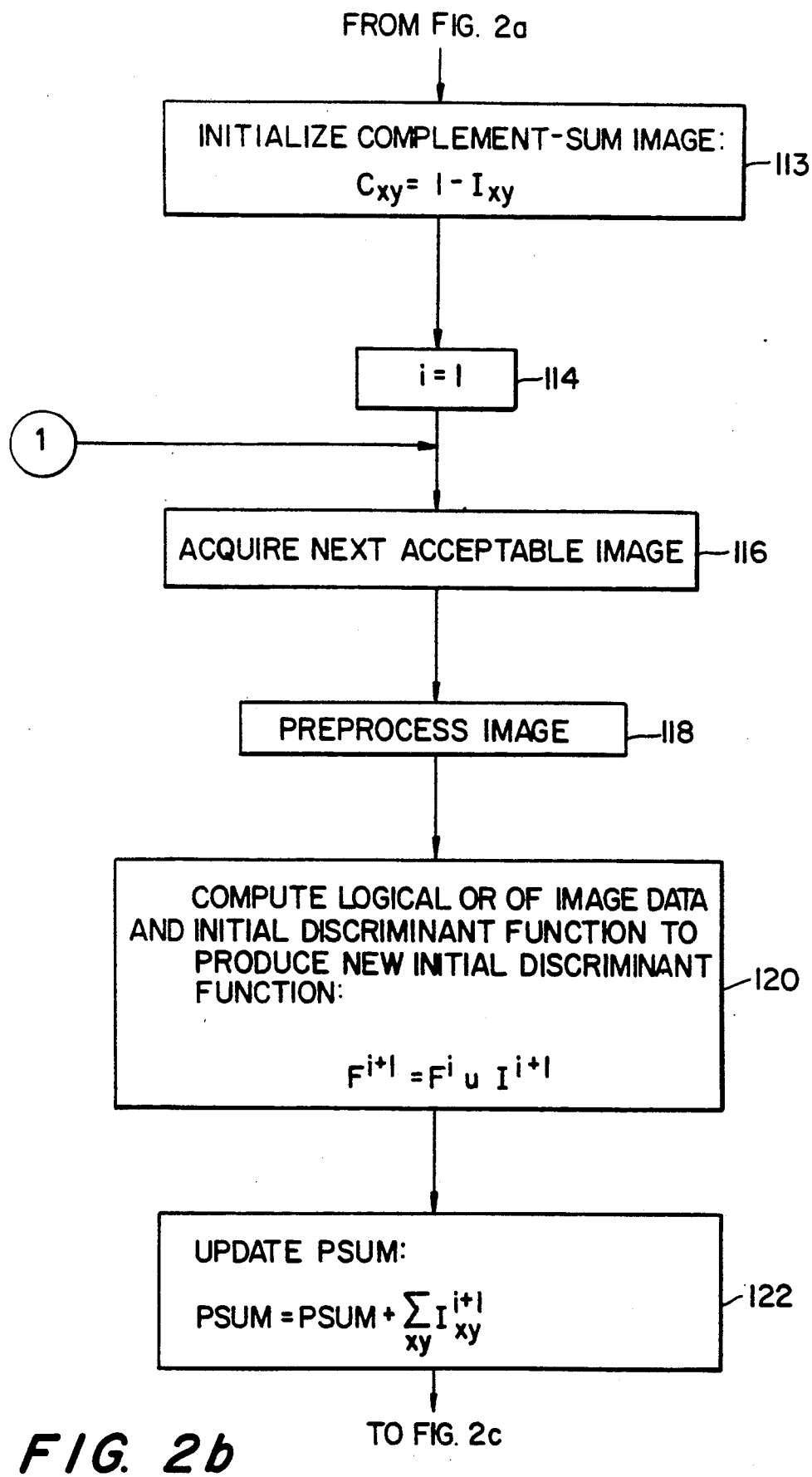
Figure 2C:
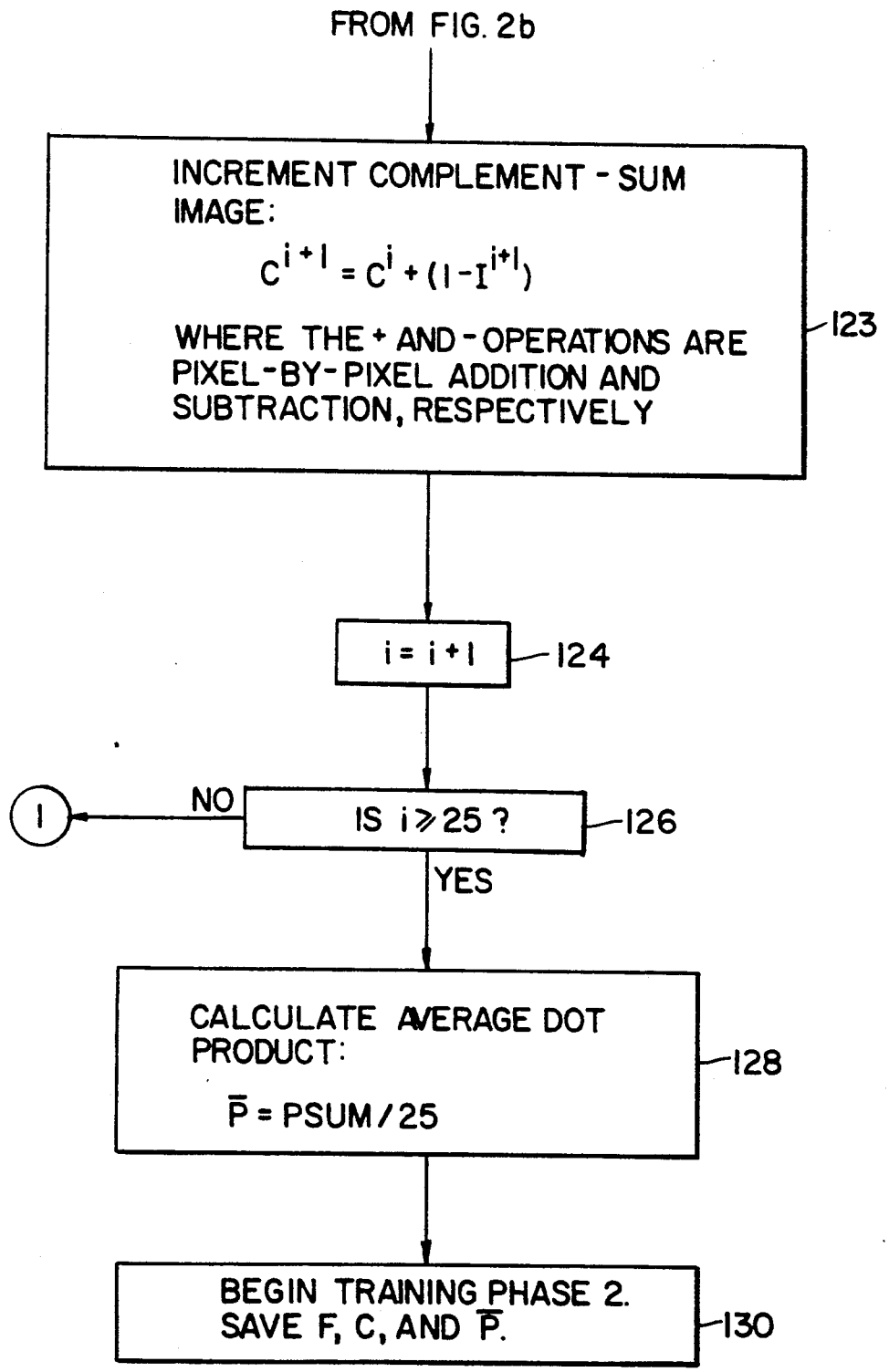

The illustrative filter function of this invention is computed during a "training" mode of operation of the apparatus of FIG. 1. A first phase of this training mode is shown in FIG. 2 in which steps 102-112 may be identical to the similarly numbered steps in the prior patent. It should be emphasized here, however, that in the present embodiment step 108 includes edge detecting the image.

In new step 113 each pixel value in the first image is complemented to produce an initial complement-sum image C. Processing then continues in steps 114-118 as in the prior patent. Again, step 118 here includes edge detecting the image.

In new step 123 the complement-sum image C is incremented by the complement of each successive phase 1 training image. Processing then continues with steps 124-130 as in the prior patent except that in step 130 the complement-sum image C is saved along with the other specified information.

Figure 3A:
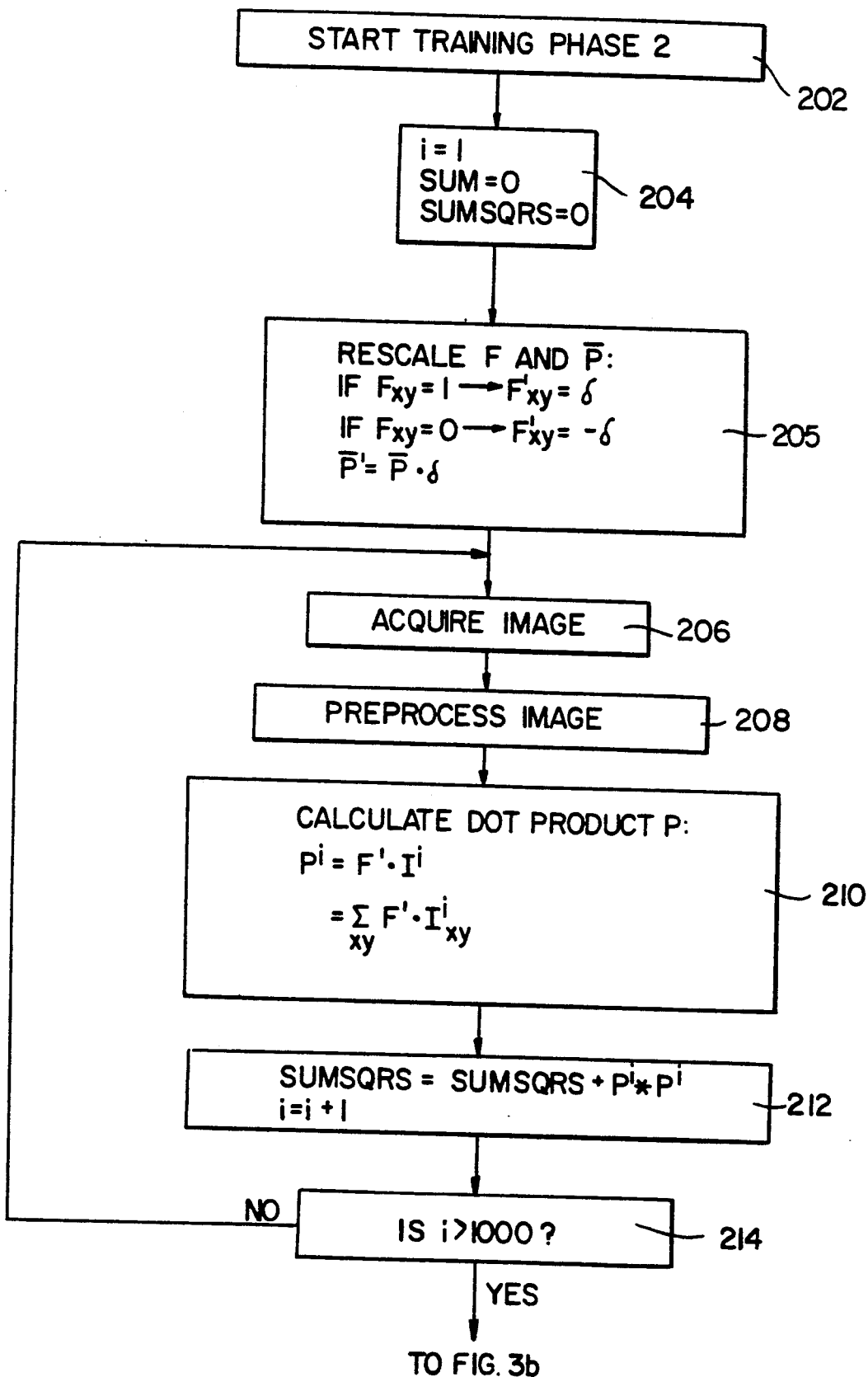
FIGS. 3a and 3b (referred to collectively as FIG. 3) are a flow chart of a further portion of an illustrative product appearance inspection method in accordance with this invention.
Figure 3B:
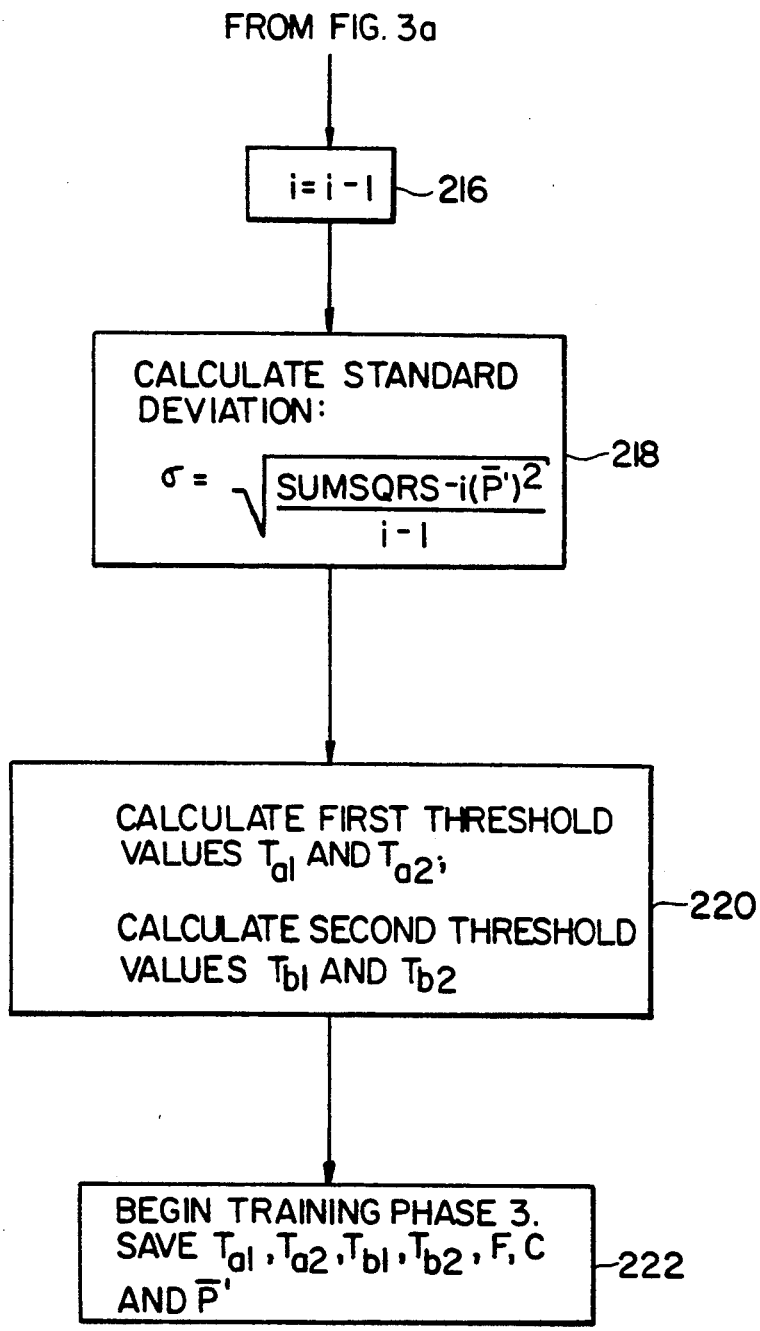
Figure 4A:
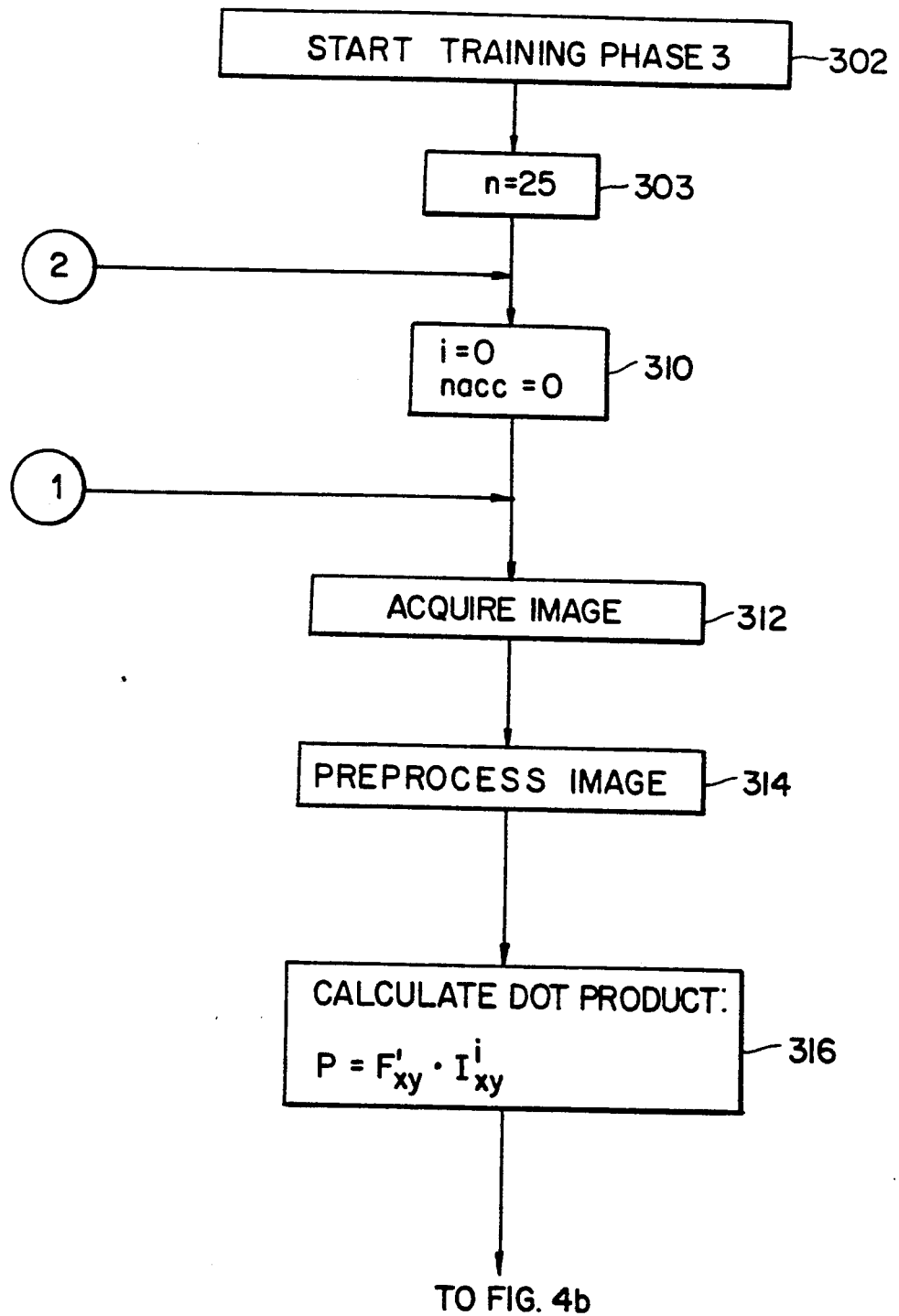
FIGS. 4a-4e (referred to collectively as FIG. 4) are a flow chart of a still further portion of an illustrative product appearance inspection method in accordance with this invention.
Figure 4B:
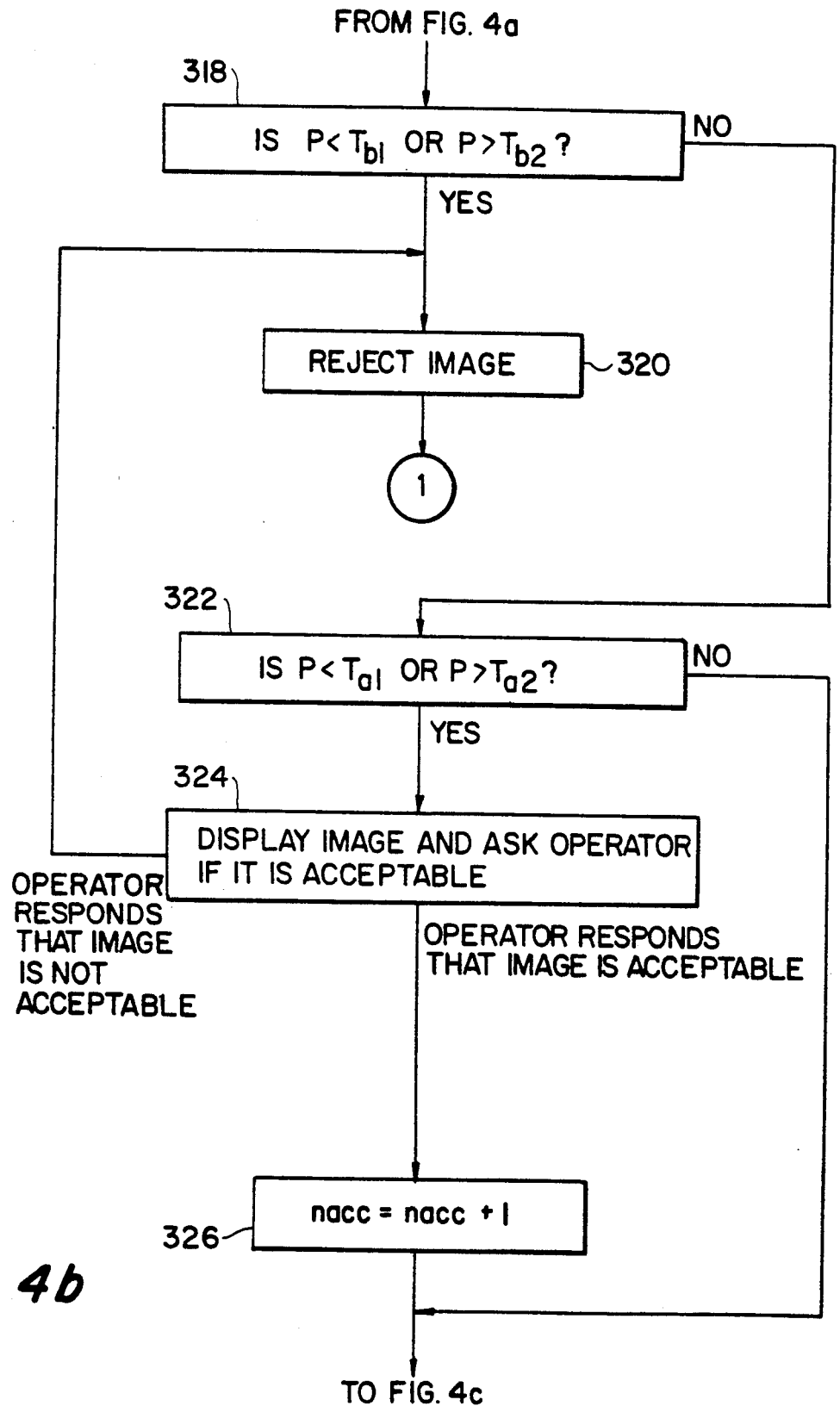
Figure 4C:
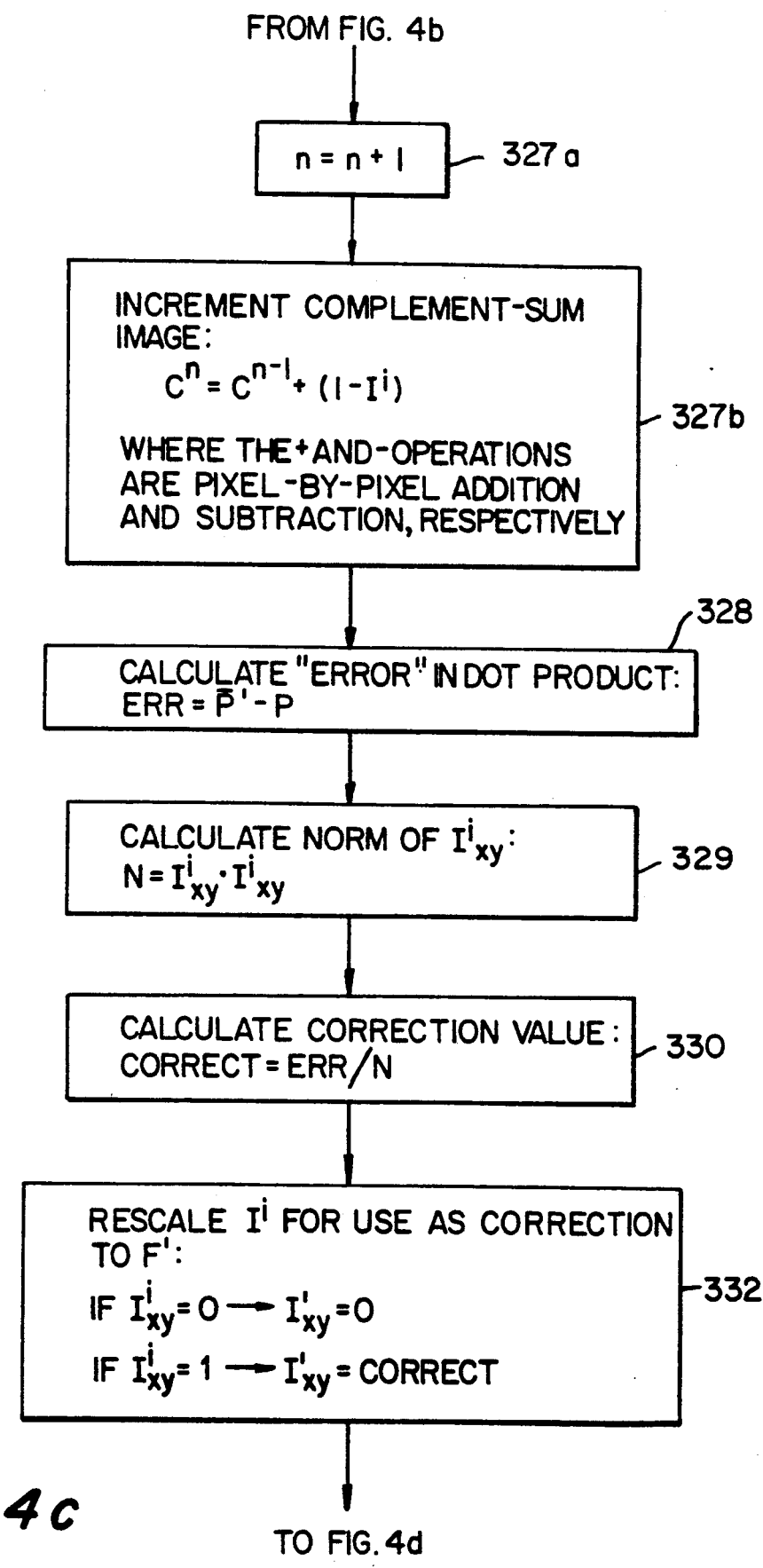
Figure 4D:
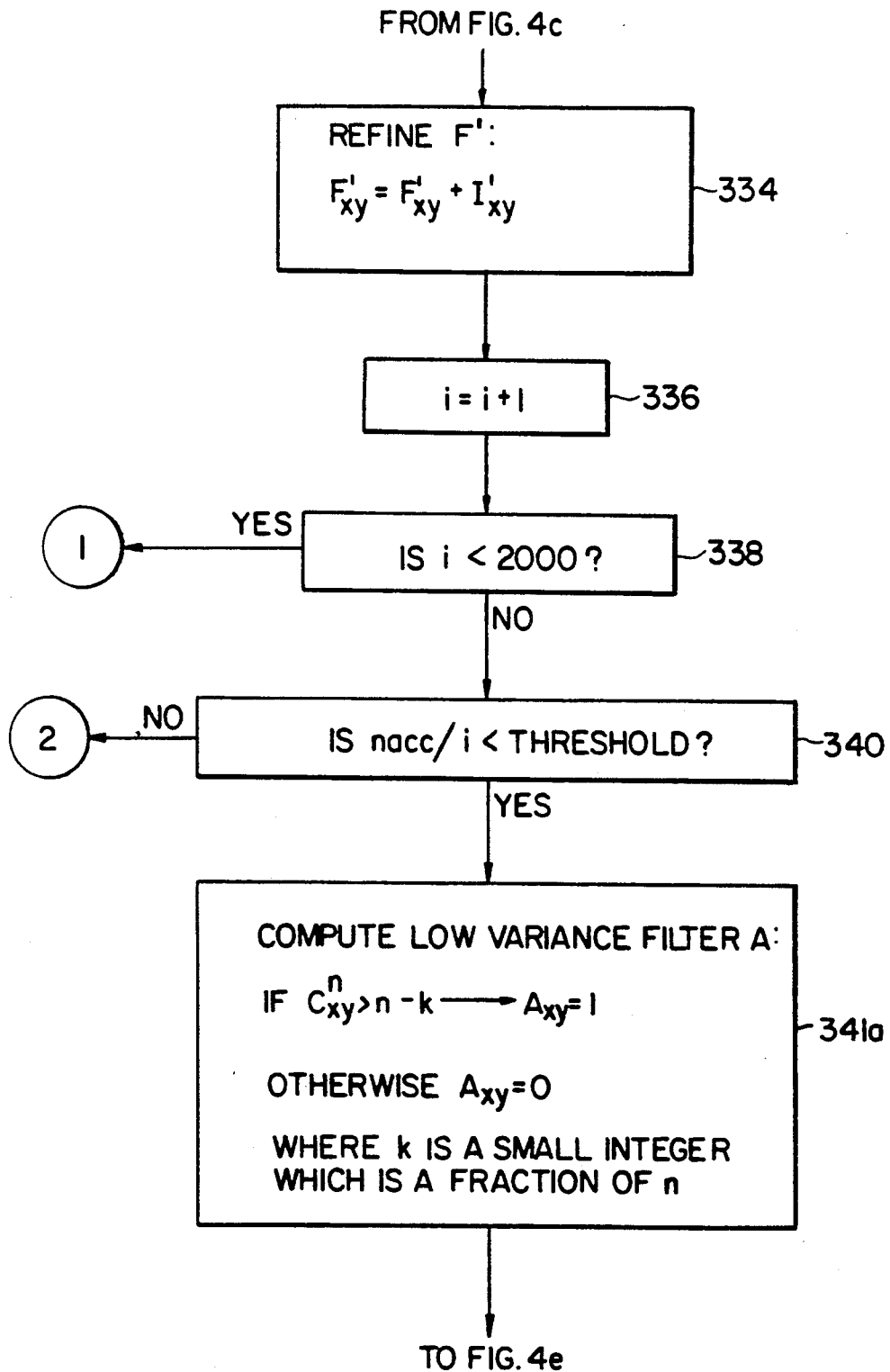
Figure 4E:
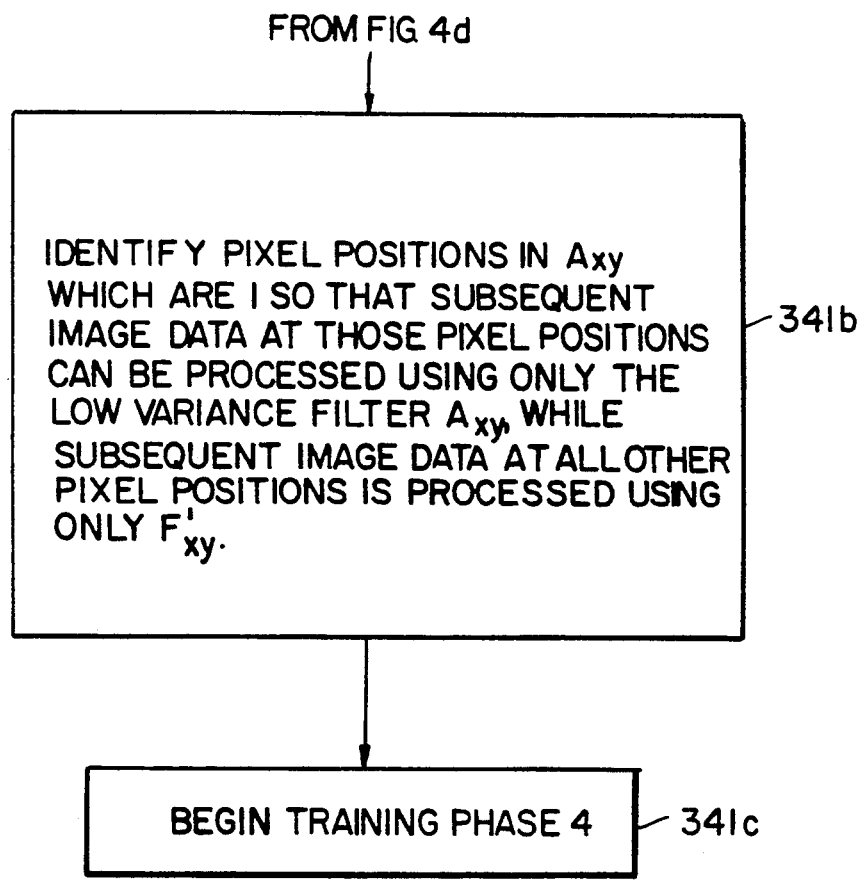

Training phase 2 (steps 202-222; FIG. 3) may be exactly the same as in the prior patent. Accordingly, it will not be necessary to describe these steps again in detail here except to note that in step 222 the complement-sum image C from phase I continues to be saved for use in training phase 3.

As in the prior patent, training phase 3 begins with step 302. In new step 303 a variable n is set equal to 25 (the number of phase 1 training images). Steps 310-326 are then identical to the similarly numbered steps in the prior patent, although in step 314 it must again be emphasized (as with steps 108 and 118 above) that this step includes edge detecting the image. In new step 327a n is incremented by 1, and in new step 327b the complement-sum image C is incremented by the complement of the image data acquired in step 312 and preprocessed in step 314. Note that steps 327a and 327b are performed only if the image has been determined to be acceptable. Processing then continues with steps 328-340 as in the prior patent.

When the performance of step 340 produces an affirmative response, new step 341a is performed. In step 341a the low variance filter A is computed based on the last values of the complement-sum image C. For each pixel in which the complement-sum image C is greater than $n-k$ (where k is a small integer which is a fraction of n), the corresponding pixel value is set equal to 1 in low variance filter A. All other pixels in A are set equal to 0. Accordingly A is 1 for all pixels which are not at or near edges (i.e., significant changes in image intensity) in any or at most a very small number (i.e., k) of the edge enhanced and binarized phase 1 and phase 3 training images. A is 0 for all pixels for which there is any significant data (i.e., 1's) in the edge enhanced and binarized phase 1 and phase 3 training images. The regions in which A is 1 therefore automatically identify all areas in the training images which are without significant changes in image intensity.

Figure 5A:
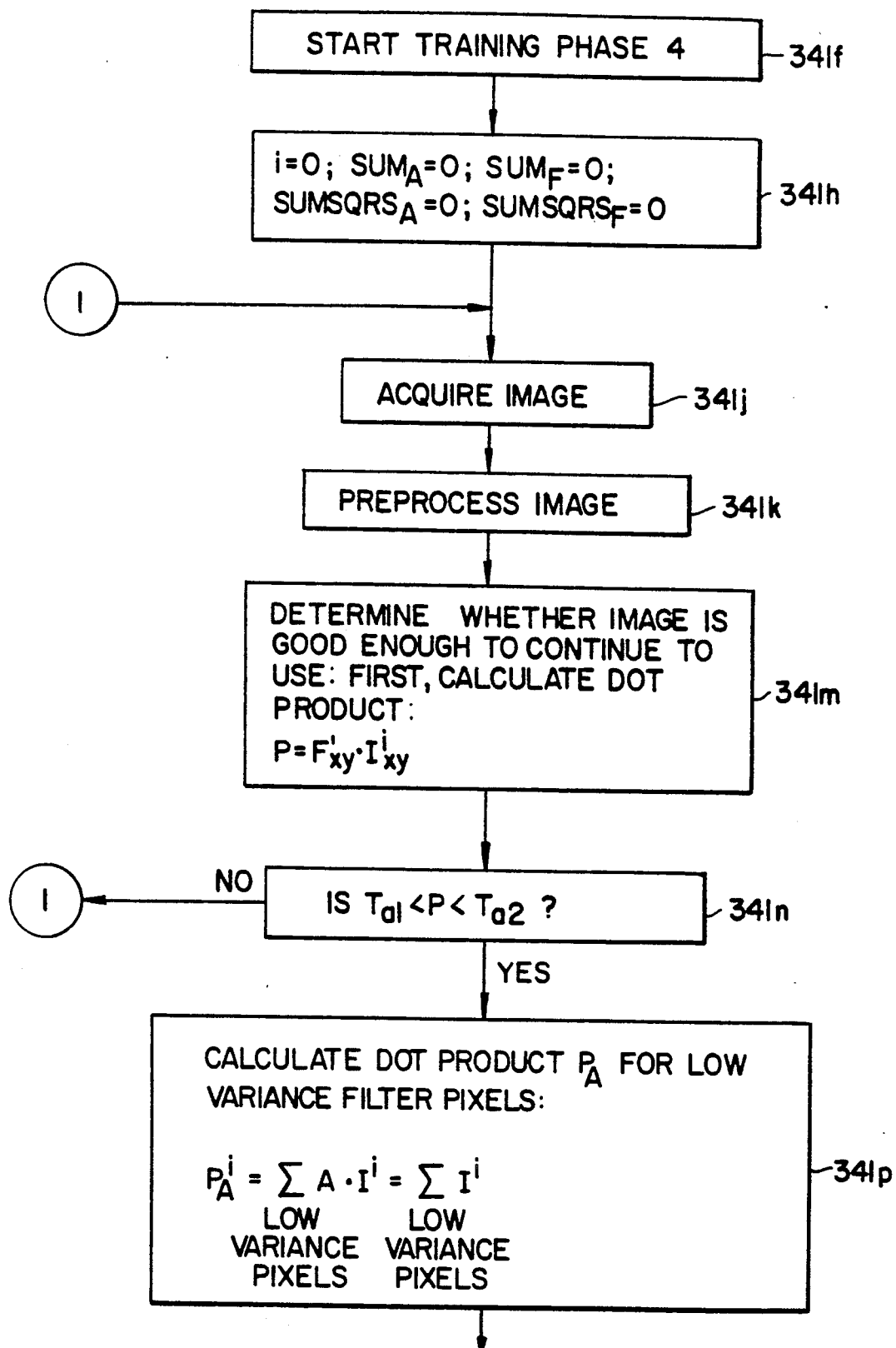
FIGS. 5a-5c (referred to collectively as FIG. 5) are a flow chart of yet a further portion of an illustrative product appearance inspection method in accordance with this invention.
Figure 5B:
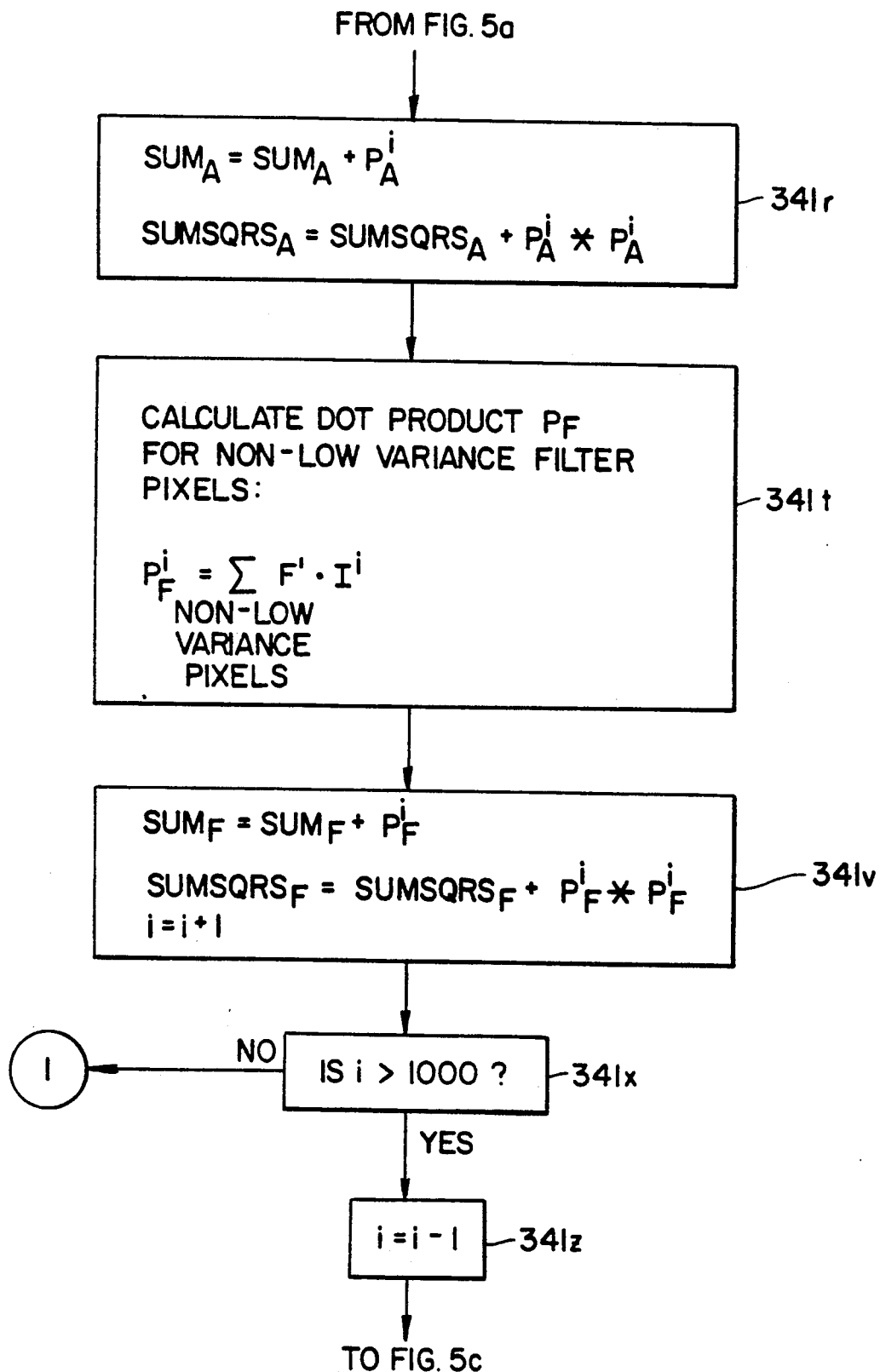
Figure 5C:
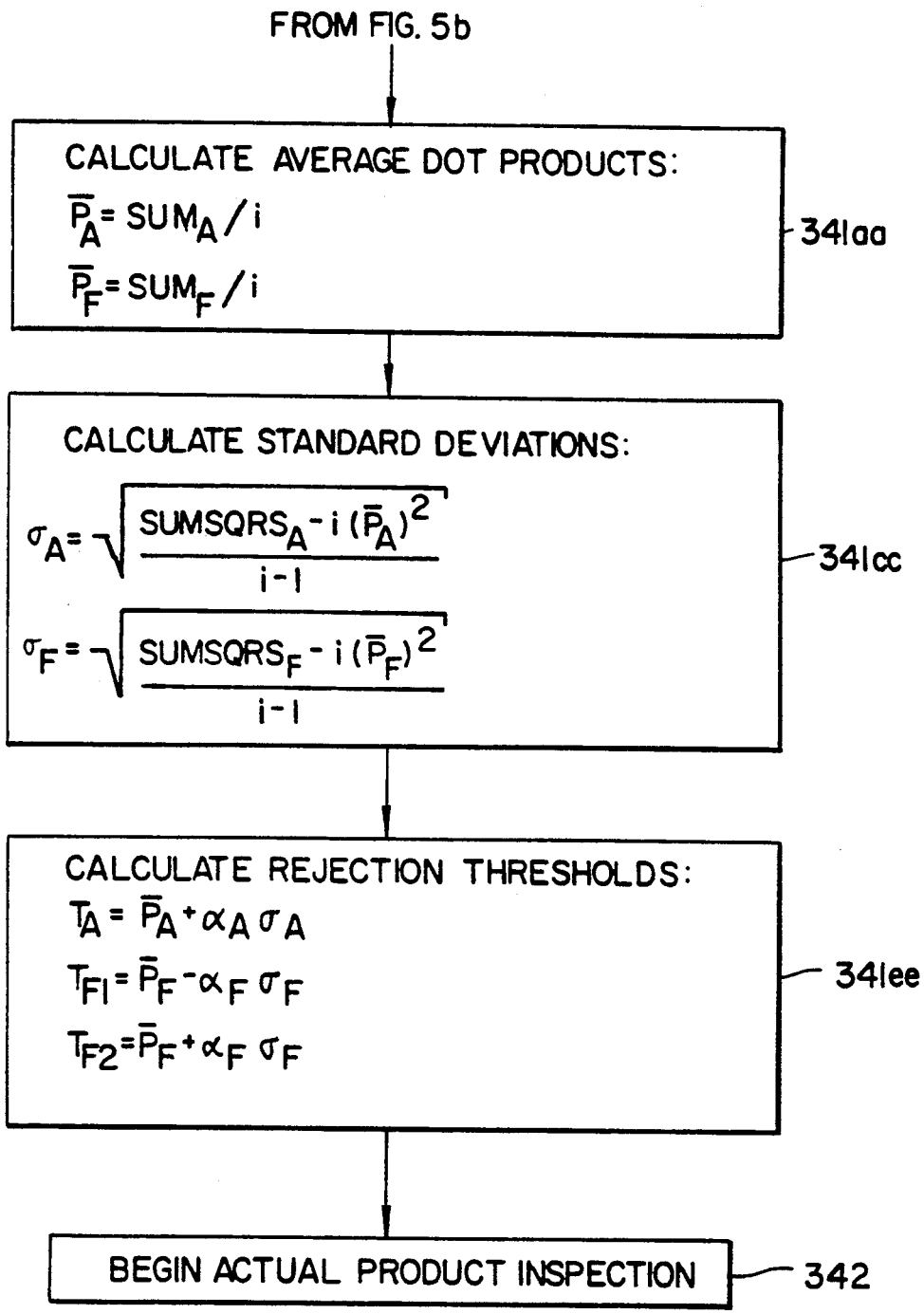

It is now necessary to compute image acceptance (or rejection) criteria for use with each of filters A and F for the image areas in which those filters are to be used. This is done in new training phase 4 which is shown in FIG. 5. In step 341f training phase 4 begins, and in step 341h several variables used in this phase are initialized. In step 341j the first phase 4 training image is acquired and preprocessed in step 341k. These steps may be identical to previously described steps such as 206 and 208. In step 341m the image is screened to determine whether it is good enough to continue to use. This is done by calculating the dot product of the image data and the discriminant function from the final performance of step 334. In step 341n this dot product value is compared to the first threshold values computed in step 220. If the dot product value is between these threshold values, the image is determined to be good enough for further use, and control passes to step 341p. Otherwise the image is discarded by returning control to step 341j where another image is acquired.

In step 341p the dot product of the low variance filter A and the image data for only those pixels for which the low variance filter is to be used is computed. Because low variance filter A is 1 for all of these pixels, this dot product is just the sum of those pixel values in the image data.

In step 341r a sum ("SUM") of the low variance filter dot products is updated, and a sum of the squares ("SUMSQRS") of these dot products is also updated.

In step 341t the dot product of the discriminant function F and the image data for only those pixels not used is step 341p is computed. In step 341v associated SUM and SUMSQRS variables are updated. Also in step 341v the counter variable i is incremented.

In step 341x i is compared to a predetermined threshold value (e.g., 1000) to determine whether a sufficient number of phase 4 training images have been processed. If not, control returns to step 341j. If so, control passes to steps 341z where i is decremented by 1.

In step 341aa the average of the dot products associated with each of low variance filter A and discriminant function F is calculated. In step 341cc the standard deviation of each of these dot product sets is calculated. In step 341ee rejection thresholds T are computed for each of low variance filter A and discriminant function F. In each case the threshold is the associated average dot product plus or minus a predetermined multiple of the associated standard deviation. Only an upper threshold value is associated with low variance filter A. Both upper and lower threshold values are needed for discriminant function F. Training phase 4 concludes with step 342.

As a possible alternative to the foregoing steps of calculating the rejection threshold for use with low variance filter A, an arbitrary rejection threshold can simply be selected. This selected number will be the upper limit on the number of pixels in the image regions covered by the low variance filter that may deviate from the expected value. In effect this number is a measure of the maximum "blemish" size that will be accepted in an image.

Figure 6:
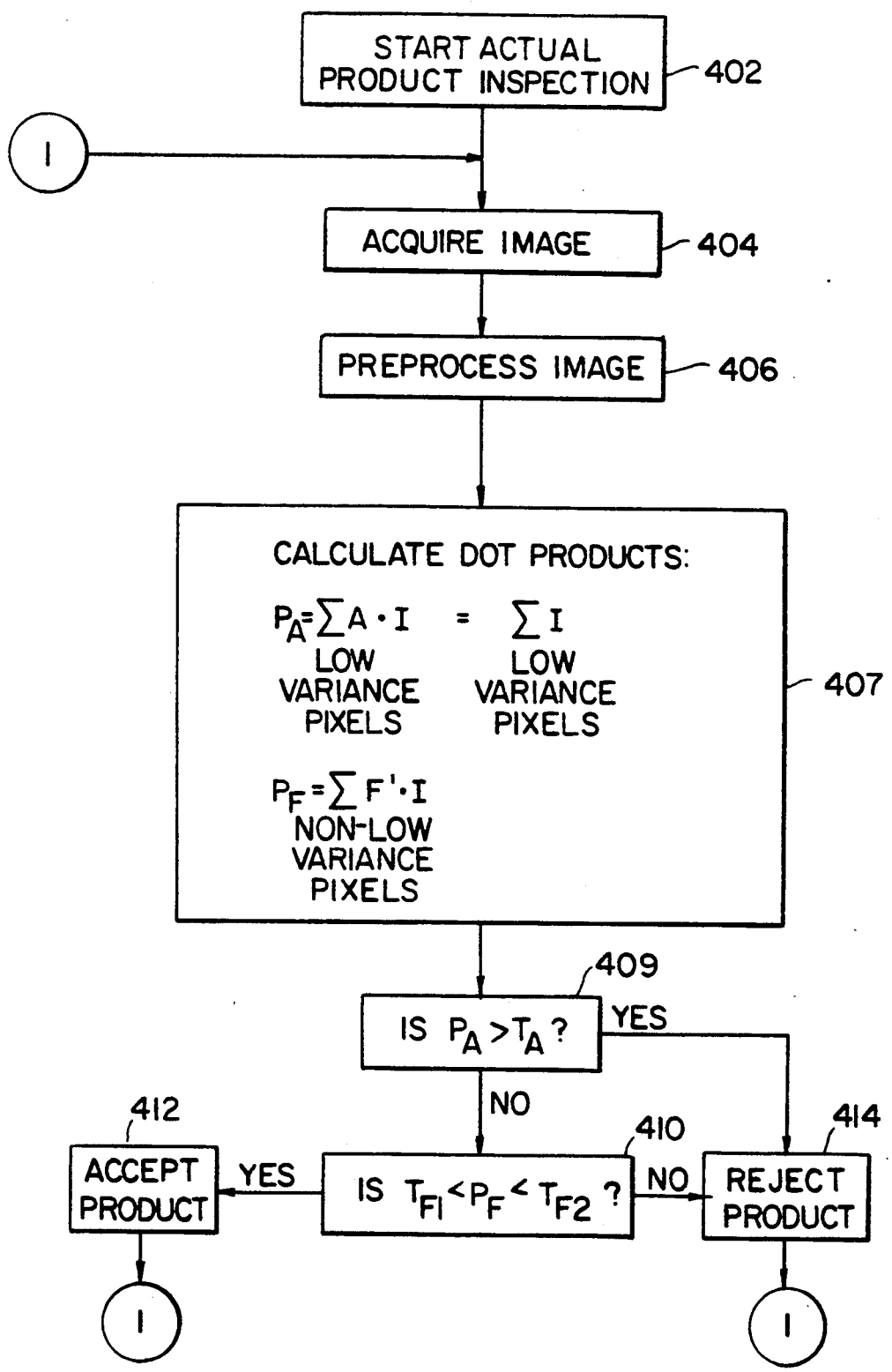
FIG. 6 is a flow chart of still a further portion of an illustrative product appearance inspection method in accordance with this invention.

As shown in FIG. 6, actual product inspection begins with step 402. In step 404 a product image is acquired and preprocessed in step 406. Steps 404 and 406 may be similar to above-described steps 206 and 208.

In new (or at least revised) step 407 two dot products are computed. The first of these covers only those pixels where low variance filter A is active (i.e., 1). Because A is 1 at all of these pixels, the dot product of A and the image data for these pixels is just the sum of the image data for these pixels. The second dot product computed in step 407 covers only those pixels where low variance filter A is inactive (i.e., 0) and is the dot product at those pixels of the discriminant function F and the image data.

In new step 409 the dot product associated with low variance filter A is compared to the corresponding rejection threshold value from step 341ee. If this dot product exceeds the rejection threshold value, the product is determined to have an unacceptable appearance and is rejected in step 414. Otherwise, the product may have an acceptable appearance and control passes to step 410 where the dot product associated with the discriminant function is compared to the corresponding threshold values from step 341ee. If this dot product is between these threshold values, the product is determined to have an acceptable appearance and is accepted at step 412. Otherwise, the product is determined to have an unacceptable appearance and is rejected in step 414. After performance of either step 412 or step 414, control returns to step 404 where processing of another product image begins.

The illustrative inspection system described above automatically breaks the image area down into two regions with different image characteristics. Each of these regions is then processed using a filter function which is better suited to that region. The region in good images which is free of abrupt changes in image intensity (edges) is processed using the low variance filter A. This low variance processing can be made highly sensitive to even very small defects in the associated image region by appropriate choice of the associated rejection threshold T in step 341ee. The other image region (which is typically mutually exclusive and collectively exhaustive with the low variance region) is processed in accordance with discriminant function F. This processing can be made tolerant of acceptable variation in the associated more complex portions of the image (again by appropriate computation of F and the associated rejection thresholds in step 341ee) without in any way affecting the sensitivity of the low variance analysis applied to the other portions of the image. Similarly, stringent low variance rejection criteria do not contribute any instances of false rejection due to acceptable image variations outside the low variance region.

If desired, even better performance of the foregoing system can be achieved by further segmenting either or both of the low variance filter region or the discriminant function region.

Although in the illustrative system described in detail above, the low variance filter is based on training images which have been edge detected, other low variance filters based on any other suitable image characteristic can be employed in accordance with this invention, either in addition to or instead of the one described above. For example, a low variance filter can be computed from the logical AND of images which have been binarized but not edge enhanced. This low variance filter has 1's for all pixels which are 1 in all of the training images. (If desired, the strict logical AND can be replaced by a summation-and-threshold type computation so that the low variance filter has 1's for all pixels where substantially all of the training images have 1 s. This "approximate logical AND" computation can be exactly like the computation of C in FIGS. 2 and 4 and the conversion of C to low variance filter A in step 341a.) Elsewhere this low variance filter is 0. The dot product of this low variance filter and all good images should be substantially constant within a relatively narrow range. If this dot product is outside this range, the product can be rejected as having an unacceptable appearance.

Note that the alternative low variance filter just described cannot be used for testing image integrity where either the filter or the binarized product image has 0's. Another low variance filter can be computed in accordance with this invention to test such image areas. To produce this filter each of the binarized training images is complemented (to reverse the 1's and 0's). The low variance filter is then taken as the logical AND (or approximate logical AND) of this binarized and complemented image data. The dot product of this complement low variance filter and the data for a good image should be 0 or close to 0 with small variation. Again, if a product image does not produce such a dot product with this complement filter, the product can be rejected as having an unacceptable appearance.

Note that the complement low variance filter just described, and the alternative low variance filter described just before that are mutually exclusive of one another. They can therefore both be used if desired. If both are used, the data for each pixel only needs to be processed once in accordance with the one or the other of these filters which is active (i.e., 1) for that pixel.

Figure 7A:
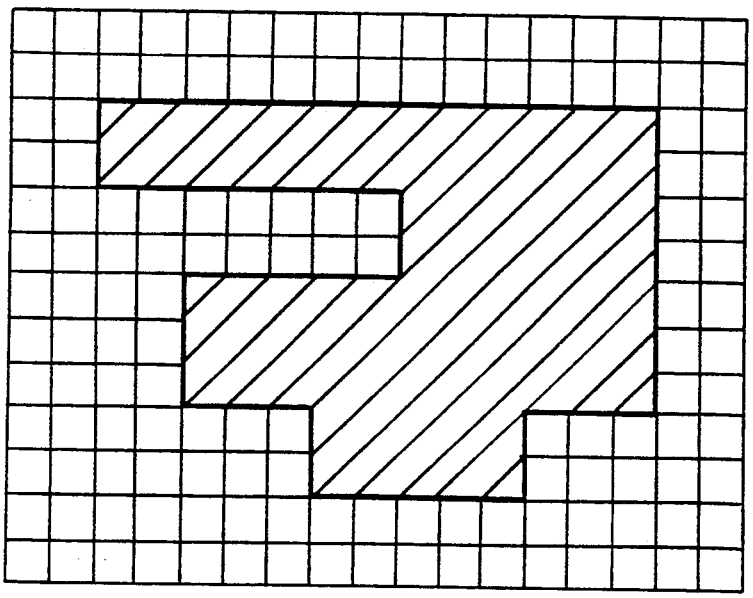
FIGS. 7a-7d show graphic elements useful in explaining certain techniques which can be employed in accordance with the principles of this invention.
Figure 7B:
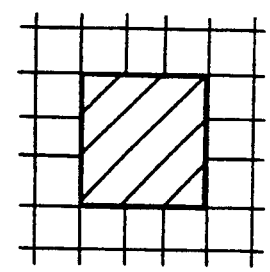
Figure 7C:
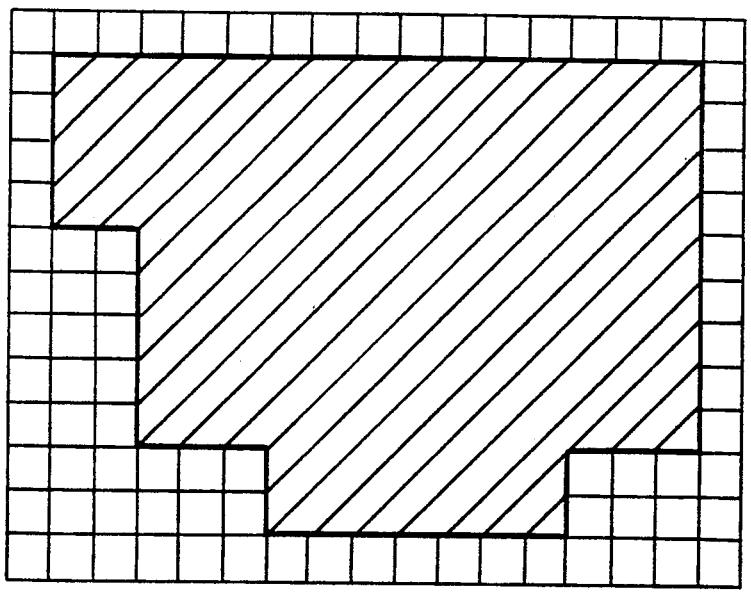
Figure 7D:
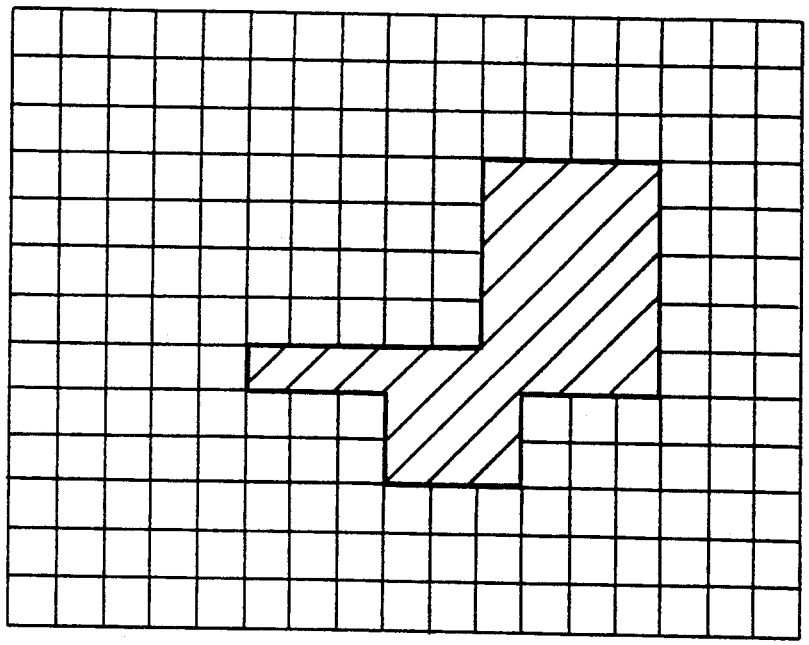

If desired, image erosion and dilation techniques can be variously used in accordance with this invention to speed and/or improve the computation of the low variance filter. These techniques are discussed in general terms in R. M. Haralick, "Statistical Image Texture Analysis" in *Handbook of Pattern Recognition and Image Processing*, T. Y. Young and K. S. Fu (eds.), Academic Press, 1986, pp. 262-64, and R. J. Schalkoff, *Digital Image Processing and Computer Vision*, John Wiley, 1989, pp. 310-15. As shown, for example, in the Schalkoff reference and reproduced here in FIGS. 7a-d, a graphic element like that shown in FIG. 7b, when used as a dilation operator on the image shown in FIG. 7a produces the dilated image shown in FIG. 7c. In particular, in a typical dilation operation the central pixel of the dilation operator (FIG. 7b) is placed over each pixel in the image to be dilated (FIG. 7a). If the pixel in the image to be dilated is on (e.g., binary 1), then all the pixels touched by the dilation operator are turned on in the dilated image (FIG. 7c). Dilation therefore tends to make an image grow and fill in. When the graphic element shown in FIG. 7b is used as an erosion operator on the image shown in FIG. 7a, the result is the eroded image shown in FIG. 7d. In particular, in a typical erosion operation the central pixel of the erosion operator (FIG. 7b) is placed over each pixel in the image to be eroded (FIG. 7a). Only if all of the pixels touched by the erosion operator are on is the pixel over which the central pixel of the erosion operator is placed left on in the eroded image (FIG. 7d). Erosion therefore tends to make an image shrink and to eliminate small anomalies in the image.

There are several ways in which dilation and/or erosion can be used in low variance filter processing in accordance with this invention to improve performance and/or reduce training set size and training time. For example, after the low variance filter has been generated as described above, the resulting low variance filter can be eroded using the operator shown in FIG. 8. This removes one pixel from each edge of all low variance pixel groups, thereby eliminating small defects, blemishes, or anomalies in the low variance filter and rendering subsequent image processing using the low variance filter less sensitive to small deviations from what is expected at the edges of the low variance regions. FIG. 9 shows how the steps in FIG. 4 can be augmented with an erosion operation step. In step 314a low variance filter A is computed as described above in connection with FIG. 4. In step 341a' low variance filter A is subjected to an erosion operation as described immediately above. The resulting eroded filter A is used in all subsequent steps. In step 341b all pixel positions which are 1 in eroded filter A are identified as described above in connection with FIG. 4 and processing continues as in the previously described FIGS.

Figure 8:
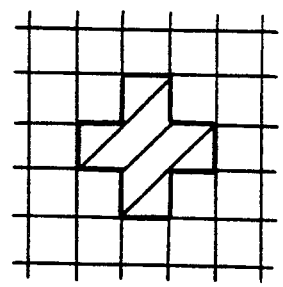
FIG. 8 shows another graphic element which can be employed in accordance with the principles of this invention.
Figure 9:
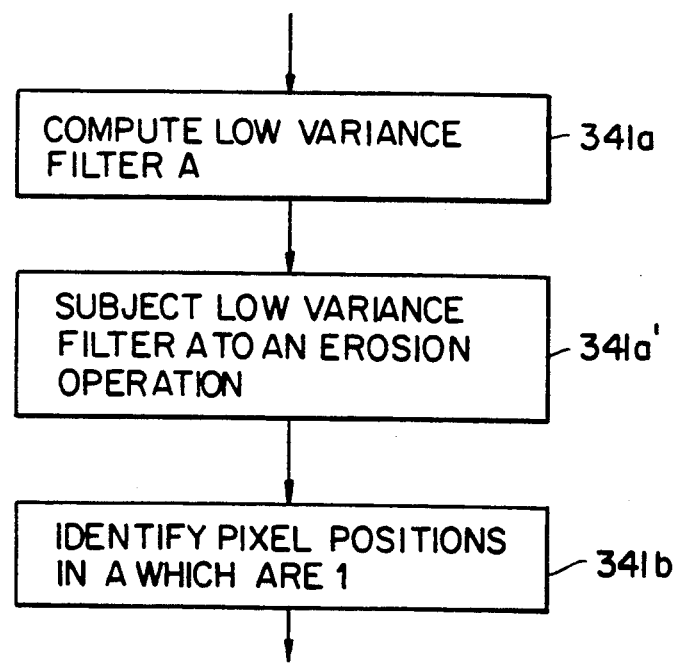
FIG. 9 is a flow chart showing how a portion of FIG. 4 can be modified in accordance with this invention.

Although FIG. 8 shows a particularly preferred erosion operator, it will be understood that any other suitable erosion operator can be used if desired.

Figure 10A:
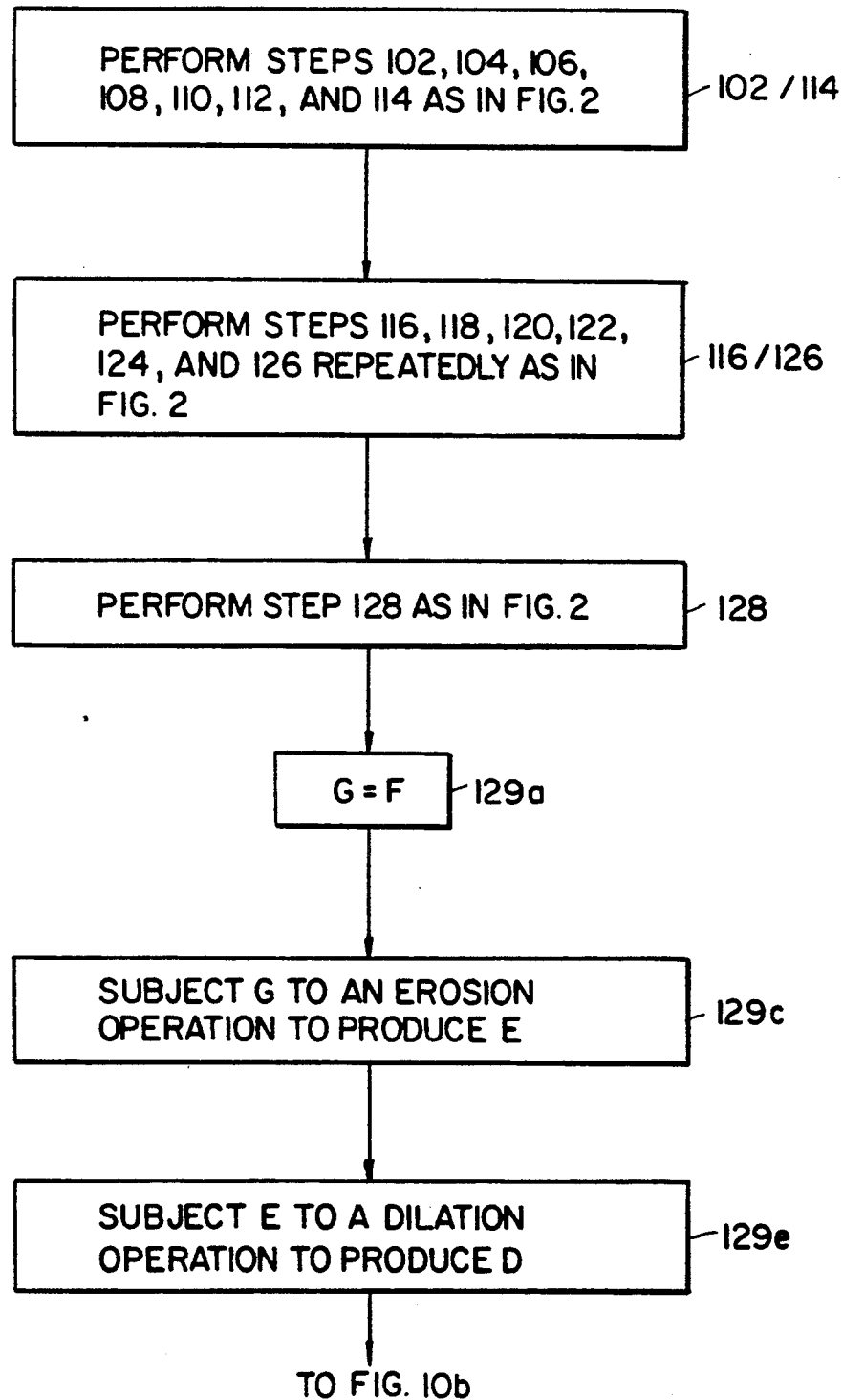
FIGS. 10a and 10b (referred to collectively as FIG. 10) are a flow chart of an alternative to FIG. 2 in accordance with this invention.
Figure 10B:
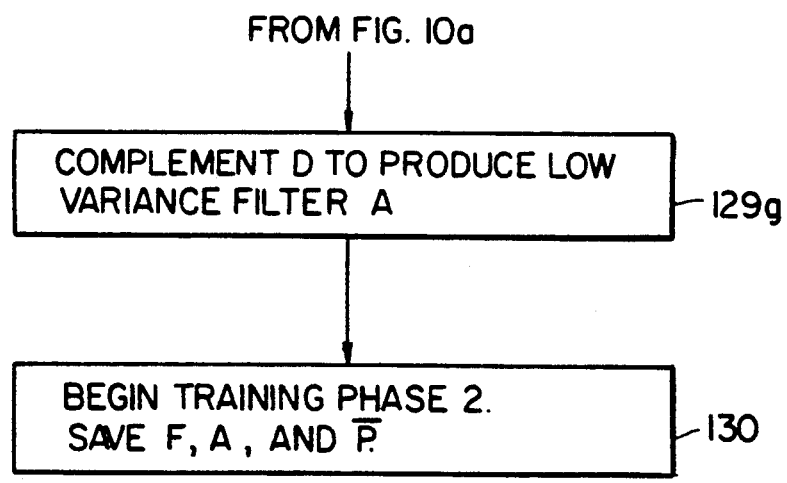

Another way in which erosion and dilation can be used in accordance with this invention is to substantially abbreviate the computation of the low variance filter. For example, excellent low variance filters can be produced in accordance with this invention from just a simple combination of the first few training images, followed by erosion and then dilation of the combined image data. FIG. 10 shows how the steps in FIG. 2 can be modified to compute low variance filter A in this manner.

In step 102/114 steps 102, 104, 106, 108, 110, 112, and 114 are performed as in FIG. 2. Note that step 113 from FIG. 2 is omitted. In step 116/126 steps 116, 118, 120, 122, 124, and 126 are repeatedly preformed as in FIG. 2. Note that step 123 from FIG. 2 is omitted. Accordingly, after the last performance of step 126, the discriminant function F is the logical OR of the 25 phase 1 training images. Step 128 is performed as in FIG. 2, and then the low variance filter is computed from F as will now be described.

Figure 11:
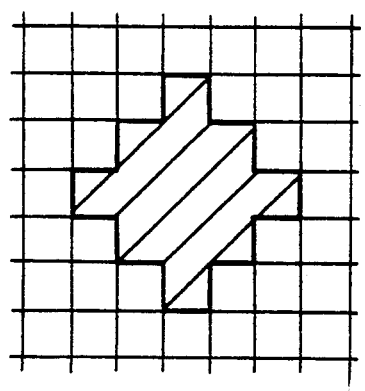
FIG. 11 shows still another graphic element which can be employed in accordance with this invention.

In step 129a G is set equal to F. In step 129c G is subjected to an erosion operation using the erosion operator shown in FIG. 8 or any other suitable erosion operator to produce eroded discriminant function E. In step 129e E is dilated using the dilation operator shown in FIG. 11 or any other suitable dilation operator to produce dilated discriminant function D. These erosion and dilation operations remove any speckle of size four pixels or smaller and add an additional pixel to the edges of the OR image. In step 129g D is complemented to produce low variance filter A. Phase 2 training then begins with step 130 substantially as in FIG. 2 except that A rather than C (which is not computed in FIG. 10) is saved. Because the low variance filter A is completely computed in training phase 1 in the embodiment shown in FIG. 10, all of the steps in FIGS. 3-5 associated with computing the low variance filter can be omitted when the steps of FIG. 10 are used in place of the steps of FIG. 2. This substantially abbreviated computation of the low variance filter therefore substantially reduces the time required to train the system to begin a product inspection (FIG. 6).

Figure 12:
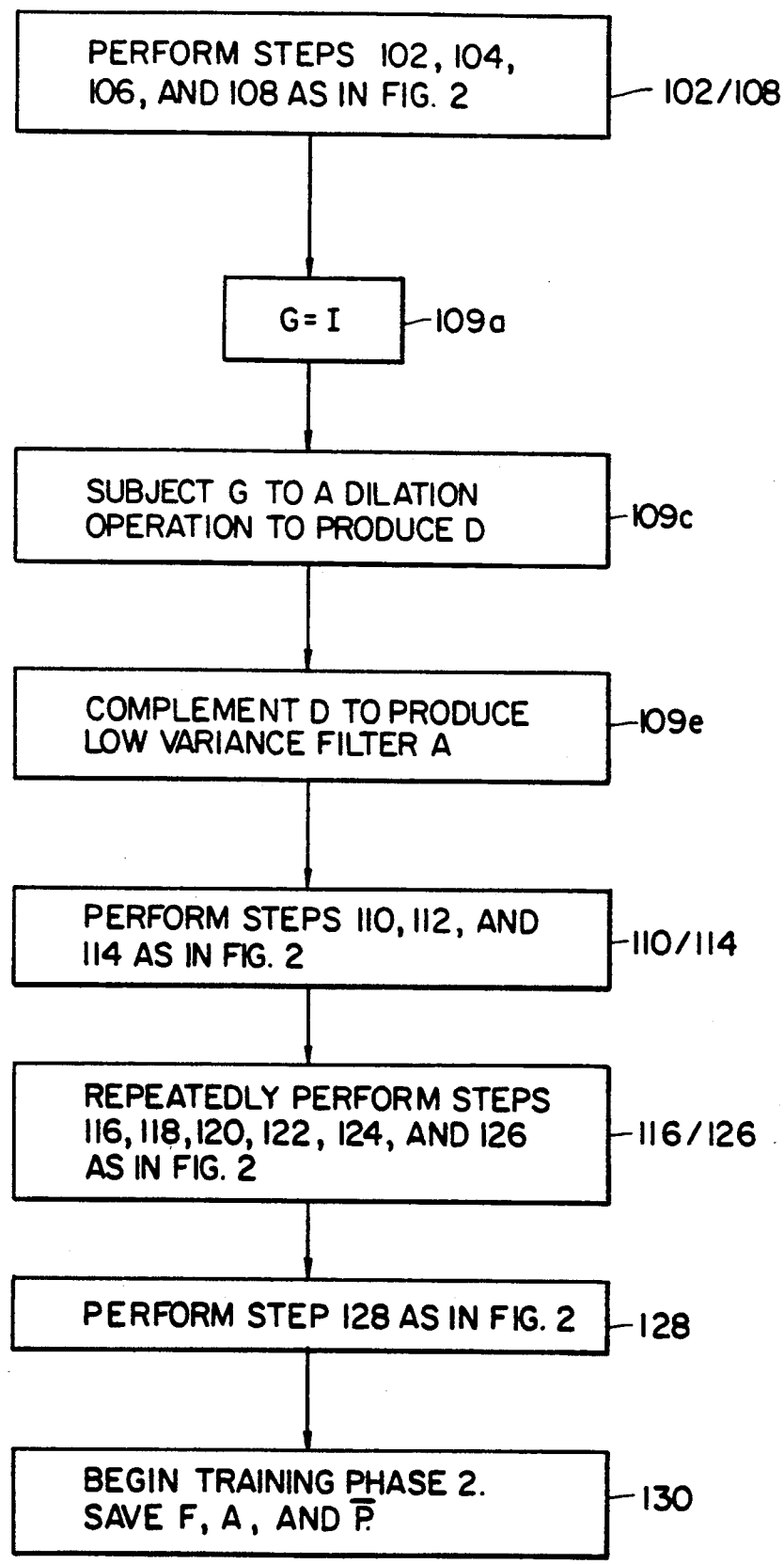
FIG. 12 is a flow chart of another alternative to FIG. 2 in accordance with this invention.

FIG. 12 shows another way in which operations like erosion and dilation can be used to speed the computation of low variance filter A in accordance with this invention. In this embodiment the low variance filter is constructed from a single good image which is assumed to be the first acceptable image processed in training phase 1. Accordingly, in step 102/108 steps 102, 104, 106, and 108 are performed as in FIG. 2 to acquire and preprocess the first acceptable image I. In step 109a G is set equal to I. In step 109c G is subjected to a dilation operation using a suitable dilation operator to produce D. The dilation operator is selected so that normal variations in the image will be incorporated in the dilated image D. In step 109e D is complemented to produce low variance filter A. Processing then continues as in FIG. 2 except that steps 113 and 123 are omitted, and in step 130 A is saved rather than C. Also, because low variance filter A has been completely computed in training phase 1, all steps associated with computation of A can be deleted from the subsequent training phases (FIGS. 3-5).

Figure 13:
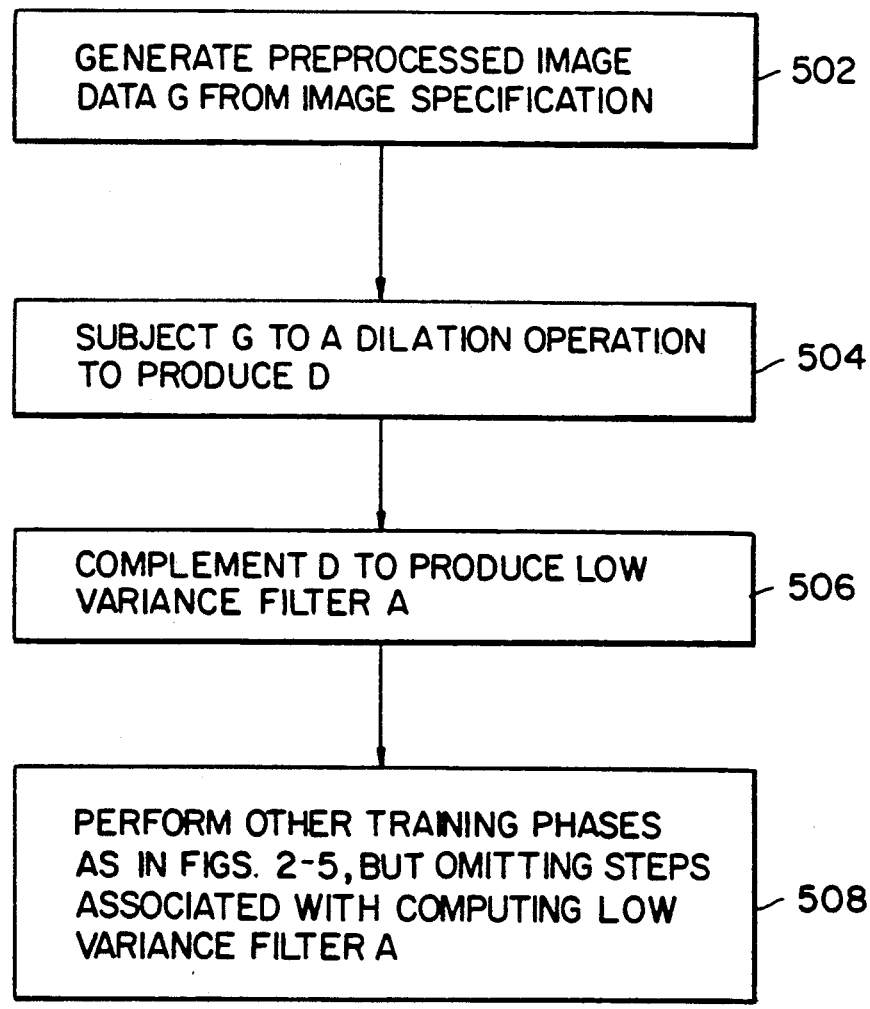
FIG. 13 is a flow chart showing another possible aspect of the invention.

If desired, instead of generating low variance filter A from a single actual good image as in FIG. 12, the image data from which A is computed can be derived from image specifications as shown in FIG. 13. In step 502 image data similar to that resulting from the performance of steps 106 and 108 in FIG. 2 is derived from image specifications such as dimensions, color and intensity information, or from a drawing of the image. This image data is referred to as G. In step 504 G is dilated in a manner similar to step 109c in FIG. 12 to produce dilated image D. In step 506 D is complemented to produce low variance filter A. In step 508 the other training phases are performed as in FIGS. 2-5 to compute the discriminant function F to be used with A. Because A has already been computed, all steps required to compute A can be deleted from these other training phases.

It will be understood that the foregoing is merely illustrative of the principles of this invention, and that various modifications can be made by those skilled in the art without departing from the scope and spirit of the invention. For example, although the low variance filters employed in the depicted embodiments are 1 where the images being processed are expected to always be 0, it will be understood that other similar low variance filters can be constructed and employed if desired. It has been described how at least some of these other low variance filters can be produced, e.g., by reversing the ones and zeros in the image data in order to produce low variance filters which are 1 where all images are expected to be 1. Those skilled in the art will also appreciate that erosion and dilation are to some extent complements of one another and therefore interchangeable with one another if the data on which they are performed is complemented. In other words, if the erosion and dilation operators are chosen properly, erosion of image data can be made to produce the same results as dilation of the complement of that image data followed by re-complementing of the dilated data. Similarly, dilation of image data can be made to produce the same results as erosion of the complement of that data followed by re-complementing of the eroded data.

The invention claimed is:

1. The method of determining whether a product image is substantially similar to a plurality of training images comprising the steps of:
   similarly subdividing each of said training images and said product image into a plurality of pixel regions;
   associating a numerical value with each of said pixel regions in each of said training images and said product image, each of said numerical values being indicative of a predetermined image characteristic of the associated pixel region in the associated training image or product image;
   identifying the pixel regions in substantially all of said training images which have substantially the same associated numerical value;
   identifying the pixel regions in said product image which correspond to the pixel regions identified in the preceding step;
   combining the numerical values associated with the pixel regions in said product image identified in the preceding step to produce a composite value;
   combining the numerical values associated with the pixel regions in said training images not identified as having substantially the same value in substantially all of said training images to produce a discriminant value associated with each of said not identified pixel regions;
   computing the dot product of said discriminant values and the numerical values associated with the pixel regions in said product image which correspond to said not identified pixel regions in said training images; and
   identifying said product image as substantially similar to said training images only if said composite value is substantially equal to a predetermined composite value and said dot product is substantially equal to a predetermined dot product value.

2. The method defined in claim 1 wherein said step of associating a numerical value comprises, for each of said training images, the step of:
   processing said image so that the numerical value associated with each pixel region has a first of two predetermined values if said predetermined image characteristic of said pixel region has a predetermined relationship to a predetermined threshold image characteristic, and so that the numerical value associated with each pixel region has a second of said two predetermined values if said predetermined image characteristic does not have said predetermined relationship to said predetermined threshold image characteristic.

3. The method defined in claim 2 wherein said step of identifying the pixel regions in substantially all of said training images comprises the step of:
   identifying the pixel regions which have said first of said two predetermined values in substantially all of said training images.

4. The method defined in claim 2 wherein said step of identifying the pixel regions in substantially all of said training images comprises the step of:
   identifying the pixel regions which have said first of said two predetermined values in substantially all of said training images, and the pixel regions which have said second of said two predetermined values in substantially all of said training images.

5. The method defined in claim 1 further comprising the step of:
   edge enhancing each training image prior to performing said step of associating a numerical value.

6. The method defined in claim 1 wherein said step of associating a numerical value comprises, for each of said training images, the steps of:
   edge enhancing said training image; and
   processing said edge enhanced training image so that numerical value associated with each pixel region has a first of two predetermined values if said predetermined image characteristic of said pixel region has a predetermined relationship to a predetermined threshold image characteristic, and so that the numerical value associated with each pixel region has a second of said two predetermined values if said predetermined image characteristic does not have said predetermined relationship to said predetermined threshold image characteristic.

7. The method defined in claim 6 wherein said step of identifying the pixel regions in substantially all of said training images comprises the step of:
   identifying the pixel regions which have said first of said two predetermined values in substantially all of said edge enhanced training images.

8. The method defined in claim 1 wherein said step of combining the numerical values comprises the step of:
   adding together the numerical values associated with the pixel regions in said product image identified in the preceding step to produce said composite value.

9. The method defined in claim 1 wherein said step of combining the numerical values comprises the steps of:
   associating a filter value with each pixel region identified as having substantially the same numerical value in substantially all of said training images; and
   computing the dot product of said filter values and said numerical values associated with the corresponding pixel regions in said product image to produce said composite value.

10. The method defined in claim 1 wherein said step of identifying the pixel regions in substantially all of said training images comprises the steps of:
    for each pixel region, combining said numerical values for all of said training images to produce a combined value associated with each pixel region; and identifying the pixel regions having a substantially common combined value.

11. The method defined in claim 10 further comprising the step of:

after said step of combining said numerical values for all of said training images and before said step of identifying the pixel regions having a substantially common combined value, subjecting each of said combined values to an erosion operation which changes said combined value to a value other than said common combined value unless said combined value and a predetermined number of adjacent combined values have said common combined value.

12. The method defined in claim 10 further comprising the step of:

after said step of combining said numerical values for all of said training images and before said step of identifying the pixel regions having a substantially common combined value, subjecting each of said combined values to a dilation operation which changes a predetermined number of combined values adjacent to each combined value having said common combined value to said common combined value.

13. The method defined in claim 11 further comprising the step of:

after said subjecting step and before said step of identifying the pixel regions having a substantially common combined value, subjecting each of said combined values to a dilation operation which changes a predetermined number of combined values adjacent to each combined value having said common combined value to said common combined value.

* * * * *